(12) United States Patent
Tang et al.

(10) Patent No.: US 12,448,226 B2
(45) Date of Patent: Oct. 21, 2025

(54) DIE INSPECTION SORTING SYSTEM WITH LIMITING GROOVE FORMED ON SURFACE OF LIMITING BLOCK

(71) Applicant: SEMIGHT INSTRUMENTS CO., LTD, Suzhou (CN)

(72) Inventors: Renwei Tang, Suzhou (CN); Zhe Lian, Suzhou (CN); Yonghong Wu, Suzhou (CN); Shan Zhao, Suzhou (CN)

(73) Assignee: SEMIGHT INSTRUMENTS CO., LTD, Suzhou (CN)

( * ) Notice: Subject to any disclaimer, the term of this patent is extended or adjusted under 35 U.S.C. 154(b) by 0 days.

(21) Appl. No.: 18/433,016

(22) Filed: Feb. 5, 2024

(65) Prior Publication Data

US 2025/0051104 A1    Feb. 13, 2025

Related U.S. Application Data

(63) Continuation of application No. PCT/CN2023/134147, filed on Nov. 24, 2023.

(30) Foreign Application Priority Data

Aug. 11, 2023 (CN) .......................... 202322151170.7

(51) Int. Cl.
*H01L 21/683* (2006.01)
*B65G 47/84* (2006.01)
(Continued)

(52) U.S. Cl.
CPC ....... *B65G 47/848* (2013.01); *G01R 31/2601* (2013.01); *H01L 21/67271* (2013.01); *H01L 21/6838* (2013.01)

(58) Field of Classification Search
CPC .......... H01L 21/6838; H01L 21/67271; G01R 31/2601; B65G 47/848; B25J 18/02; B25J 18/025; B25J 9/044; F16C 13/006
(Continued)

(56) References Cited

U.S. PATENT DOCUMENTS 1,759,275 A * 5/1930 Powell .................... E21B 19/07
                                                     188/67
4,428,710 A * 1/1984 Grisebach ............. B25J 15/022
                                                     901/29
(Continued)

FOREIGN PATENT DOCUMENTS

CN        207052588 U      2/2018
CN        111785665 A     10/2020
(Continued)

*Primary Examiner* — Gerald McClain
(74) *Attorney, Agent, or Firm* — ANOVA LAW GROUP, PLLC (57) ABSTRACT

A die inspection sorting system and a formation method are provided. The die inspection sorting system includes a turntable and a plurality of die picking assemblies installed at an equal interval along a circumferential direction at an edge of the turntable. The die picking assembly includes a vertical support frame, a base installed on a front side of the vertical support frame, a suction rod installed vertically on a side of the base away from the vertical support frame, and a clamping strip. A limiting groove is disposed on a front end surface of the base, an installation groove is disposed on the front end surface of the base, a movable block is inserted in the installation groove, and a spring in a compressed state is connected between a rear end of the movable block and a bottom surface of the installation groove.

8 Claims, 5 Drawing Sheets

(51) Int. Cl.
*G01R 31/26* (2020.01)
*H01L 21/67* (2006.01)

(58) Field of Classification Search
USPC .......................... 384/58; 29/45, 123; 188/67
See application file for complete search history.

(56) References Cited

U.S. PATENT DOCUMENTS

| | | | | | |
|---|---|---|---|---|---|
| 5,653,087 | A | * | 8/1997 | Spada | B25J 15/08 |
| | | | | | 242/559.2 |
| 5,909,941 | A | * | 6/1999 | Cheng | B25J 17/0208 |
| | | | | | 33/644 |
| 2022/0242681 | A1 | * | 8/2022 | Bardi | B65G 47/914 |

FOREIGN PATENT DOCUMENTS

| | | | |
|---|---|---|---|
| CN | 215613275 U | | 1/2022 |
| CN | 215732671 U | * | 2/2022 |
| CN | 115995419 A | | 4/2023 |
| JP | H08236556 A | | 9/1996 |

* cited by examiner

DIE INSPECTION SORTING SYSTEM WITH LIMITING GROOVE FORMED ON SURFACE OF LIMITING BLOCK

CROSS-REFERENCE TO RELATED APPLICATION

This application is a continuation application of PCT/CN2023/134147, filed on Nov. 24, 2023, which claims the priority of Chinese Patent Application No. 202322151170.7, filed on Aug. 11, 2023, the entirety of all of which is incorporated herein by reference.

TECHNICAL FIELD

The present disclosure generally relates to the field of semiconductor die mounting and testing technology and, more particularly, relates to a die inspection sorting system and a formation method thereof.

BACKGROUND

Die testing and mounting are indispensable processes in the production of semiconductor dies. In the testing and mounting processes, a die sorting system (e.g., apparatus or machine) is configured to transfer the dies. The die sorting system transfers the dies to stations corresponding to the testing and mounting processes by direct contact with the dies.

In the existing technology, an installation hole is formed at a front end surface of a main body of a die pick-and-place apparatus. One end of a horizontally configured pressing socket is inserted in the installation hole, and another end of the pressing socket is at an outer side of the main body and vertically installed with a pressing bearing. A through hole is formed at an upper surface of the pressing socket and between the pressing bearing and the main body, which is for a vertically configured suction nozzle rod to pass through. An end of the pressing socket in the installation hole is connected to the main body through a pressing spring in a stretched state, such that the outer peripheral surface of the pressing bearing is in a close contact with the suction nozzle rod, thereby realizing clamping of the suction nozzle rod.

However, when the die pick-and-place apparatus is used in a die inspection sorting system, a centrifugal force generated by rotation of a turntable may cause the suction nozzle rod to have a separation trend, and a relatively long time is needed for the suction nozzle rod to recover to a stable state after the rotation stops, which may affect process efficiency and accuracy. If the effect of the centrifugal force is reduced by increasing a clamping force on the suction nozzle rod, the movement of the suction nozzle rod along the vertical direction may be interfered, which may cause rapid wear of various parts.

SUMMARY

One aspect of the present disclosure provides a die inspection sorting system. The die inspection sorting system includes a turntable and a plurality of die picking assemblies installed at an equal interval along a circumferential direction at an edge of the turntable, where a die picking assembly of the plurality of die picking assemblies includes a vertical support frame, a base installed on a front side of the vertical support frame, a suction rod installed vertically on a side of the base away from the vertical support frame, and a clamping strip installed horizontally above the base; and a front end of the clamping strip extends to a side away from the vertical support frame and is clamped to be connected to an upper end of the suction rod. A limiting groove extending vertically is formed at a front end surface of the base; a left side and a right side of the limiting groove for the suction rod to be inserted have a left inclined surface and a right inclined surface respectively; the left inclined plane and the right inclined plane are symmetrically arranged; an end of each of the left inclined plane and the right inclined plane away from the limiting groove extends forward; two left bearings spaced apart along a vertical direction are installed on the left inclined surface; and two right bearings arranged symmetrically with the two left bearings are installed on the right inclined surface; an installation groove extending horizontally is formed at the front end surface of the base; a movable block is inserted in the installation groove and slides to be matched with an inner wall of the installation groove; a limiting bearing is vertically installed on a front end of the movable block; and a spring in a compressed state is connected between a rear end of the movable block and a bottom surface of the installation groove to make the suction rod inserted in the limiting groove to be squeezed and in a contact with each of the limiting bearing, the two left bearings and the two right bearings.

Another aspect of the present disclosure provides a die inspection sorting system. The die inspection sorting system includes a turntable and a plurality of die picking assemblies installed at an equal interval along a circumferential direction at an edge of the turntable, wherein a die picking assembly of the plurality of die picking assemblies includes a vertical support frame, a base installed on a front side of the vertical support frame, a suction rod installed vertically on a side of the base away from the vertical support frame and a horizontal support plate. A limiting groove extending vertically is formed at a front end surface of the base; a left side and a right side of the limiting groove for the suction rod to be inserted have a left inclined surface and a right inclined surface respectively; the left inclined plane and the right inclined plane are symmetrically arranged; an end of each of the left inclined plane and the right inclined plane away from the limiting groove extends forward; two left bearings spaced apart along a vertical direction are installed on the left inclined surface; and two right bearings arranged symmetrically with the two left bearings are installed on the right inclined surface; an installation groove extending horizontally is formed at the front end surface of the base; a movable block is inserted in the installation groove and slides to be matched with an inner wall of the installation groove; a limiting bearing is vertically installed on a front end of the movable block; and a spring in a compressed state is connected between a rear end of the movable block and a bottom surface of the installation groove to make the suction rod inserted in the limiting groove to be squeezed and in a contact with each of the limiting bearing, the two left bearings and the two right bearings.

Another aspect of the present disclosure provides a formation method of a die inspection sorting system. The formation method includes providing a turntable; and installing a plurality of die picking assemblies at an equal interval along a circumferential direction at an edge of the turntable, where a die picking assembly of the plurality of die picking assemblies includes a vertical support frame, a base installed on a front side of the vertical support frame, a suction rod installed vertically on a side of the base away from the vertical support frame, and a clamping strip installed horizontally above the base; and a front end of the clamping strip extends to a side away from the vertical support frame and is clamped to be connected to an upper end of the suction rod. A limiting groove extending vertically is formed at a front end surface of the base; a left side and a right side of the limiting groove for the suction rod to be inserted have a left inclined surface and a right inclined surface respectively; the left inclined plane and the right inclined plane are symmetrically arranged; an end of each of the left inclined plane and the right inclined plane away from the limiting groove extends forward; two left bearings spaced apart along a vertical direction are installed on the left inclined surface; and two right bearings arranged symmetrically with the two left bearings are installed on the right inclined surface; an installation groove extending horizontally is formed at the front end surface of the base; a movable block is inserted in the installation groove and slides to be matched with an inner wall of the installation groove; a limiting bearing is vertically installed on a front end of the movable block; and a spring in a compressed state is connected between a rear end of the movable block and a bottom surface of the installation groove to make the suction rod inserted in the limiting groove to be squeezed and in a contact with each of the limiting bearing, the two left bearings and the two right bearings.

Other aspects of the present disclosure may be understood by those skilled in the art in light of the description, the claims, and the drawings of the present disclosure.

BRIEF DESCRIPTION OF THE DRAWINGS

Accompanying drawings, which are incorporated into a part of the present disclosure, illustrate embodiments of the present disclosure and together with the specification to explain the principle of the present disclosure. With reference to accompanying drawings, some specific embodiments of the present disclosure are described in detail below through a manner of illustration and not-limitation. Same reference numbers in accompanying drawings means same or similar parts or portions. Those skilled in the art should understand that accompanying drawings are not necessarily drawn according to scale.

DETAILED DESCRIPTION

Various exemplary embodiments of the present disclosure are described in detail with reference to accompanying drawings. It should be noted that unless stated otherwise, relative arrangement of assemblies and steps, numerical expressions and values described in those embodiments may not limit the scope of the present disclosure.

Following description of at least one exemplary embodiment may be merely illustrative and may not be configured to limit the present disclosure and its application or use.

The technologies, methods and apparatuses known to those skilled in the art may not be discussed in detail, but where appropriate, the technologies, methods and apparatuses should be considered as a part of the present disclosure.

In all examples shown and discussed herein, any specific value should be interpreted as merely exemplary, rather than as a limitation. Therefore, other examples in exemplary embodiment may have different values.

It is apparent to those skilled in the art that various modifications and variations may be made in the present disclosure without departing from the spirit or scope of the present disclosure. Therefore, the present disclosure is intended to cover modifications and variations of the present disclosure falling within the scope of corresponding claims (technical solutions to be protected) and their equivalents. It should be noted that, implementation manners provided in embodiment of the present disclosure may be combined with each other if there is no contradiction.

It should be noted that similar reference numerals and letters are configured to indicate similar items in following drawings. Therefore, once an item is defined in one drawing, it does not need to be further discussed in subsequent drawings.

The present disclosure can be further clearly understood through the specific examples given below, which may not limited the present disclosure.

A known good die (KGD) is defined as a package type fully supported by suppliers to meet or exceed quality, reliability, and functional data sheet specifications, with non-standardized (die specific) but completely and electronically transferable mechanical specifications. A KGD (known good die) testing apparatus (e.g., KGD testing machine, KGD tester, KGD testing equipment, or KGD test cell) is configured for the die testing before packaging and after splitting. The testing apparatus confirms that dies with desirable performance are used for packaging before high-density packaging, which improves the cumulative packaging yield. The testing apparatus may realize a fully automatic testing system and automatically realize picking, transporting, testing and unloading of dies. The testing apparatus may support multi-station parallel testing. Different stations may support different temperatures and test projects. Different stations may support static, dynamic, and avalanche function tests; and the test sequence may be adjustable. The testing apparatus may support high temperature testing with a temperature range from room temperature to 200° C. The power-on pin card may be a sealed design, support nitrogen filling protection against high-pressure sparking and nitrogen pressure monitoring and support high-temperature preheating and die surface anti-oxidation protection. It should be noted that "die" and "chip" may be interchangeable in the present disclosure, which may not be limited herein.

Figure 1:
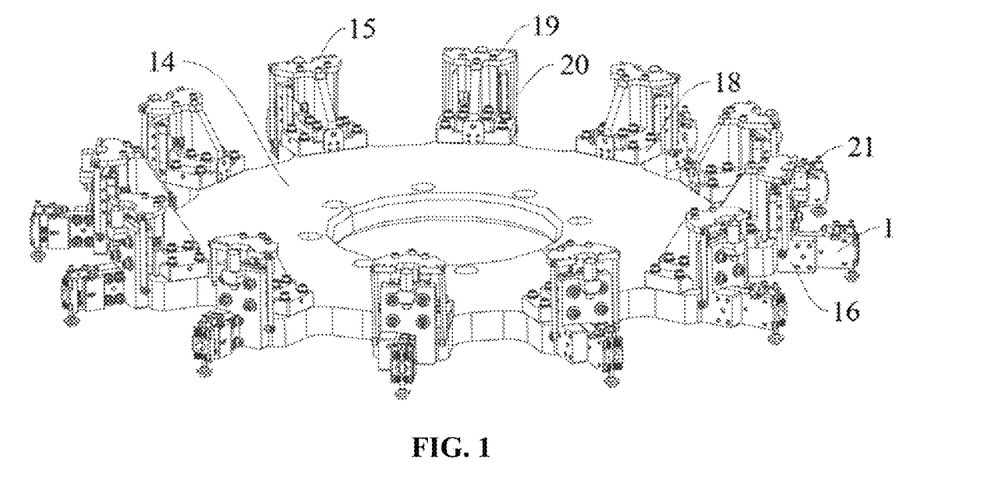
FIG. 1 illustrates an overall structural schematic of a die inspection sorting system according to various embodiments of the present disclosure.
Figure 2:
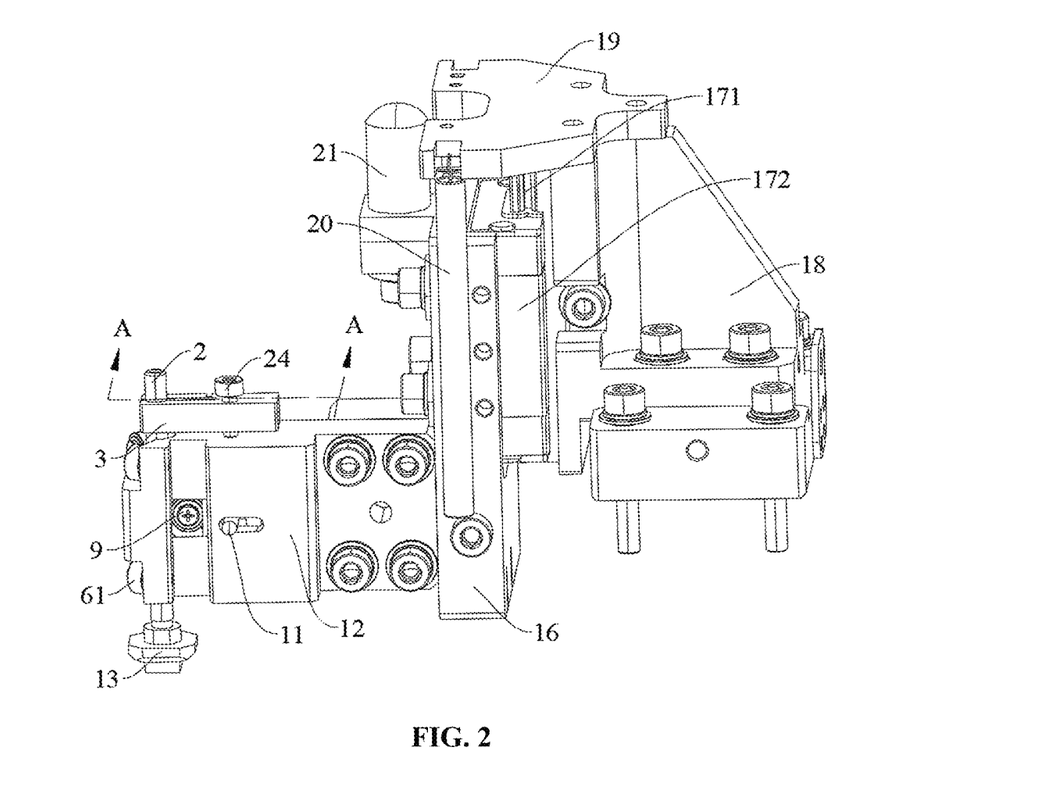
FIG. 2 illustrates a structural schematic of a die picking assembly of a die inspection sorting system according to various embodiments of the present disclosure.
Figure 3:
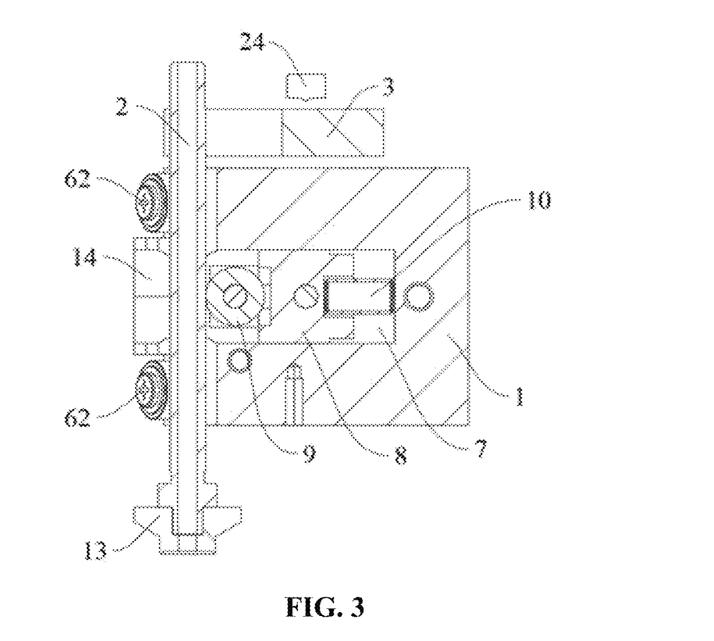
FIG. 3 illustrates a cross-sectional view along an A-A direction in FIG. 2.
Figure 4:
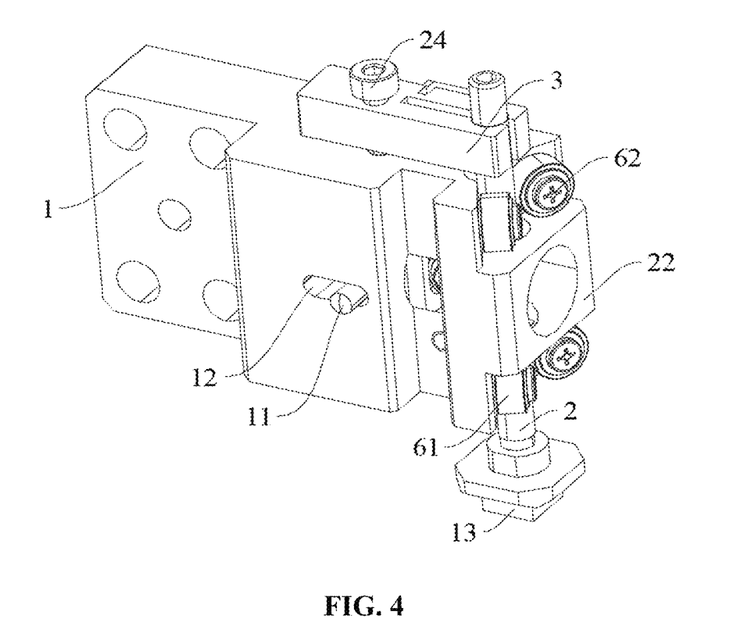
FIG. 4 illustrates a partial structural schematic of a die inspection sorting system according to various embodiments of the present disclosure.
Figure 5:
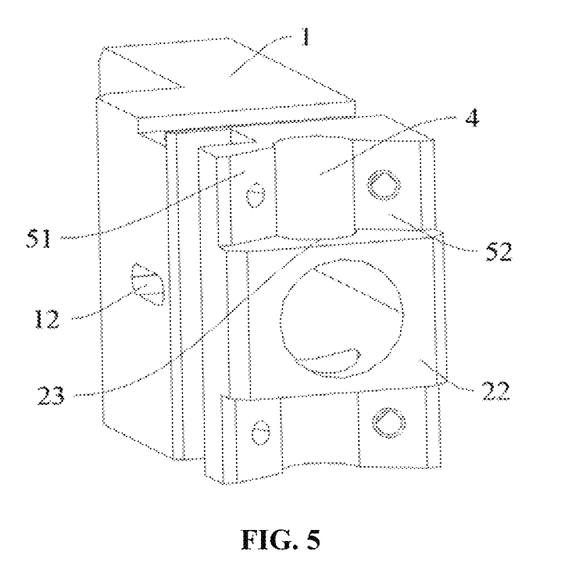
FIG. 5 illustrates a schematic of a base of a die inspection sorting system according to various embodiments of the present disclosure.

Exemplary embodiments are described in the present disclosure with reference to FIGS. 1-5, which are schematics used for describing various, different embodiments. Referring to FIGS. 1-5, FIG. 1 illustrates an overall structural schematic of a die inspection sorting system according to various embodiments of the present disclosure; FIG. 2 illustrates a structural schematic of a die picking assembly of the die inspection sorting system according to various embodiments of the present disclosure; FIG. 3 illustrates a cross-sectional view along an A-A direction in FIG. 2; FIG. 4 illustrates a partial structural schematic of the die inspection sorting system according to various embodiments of the present disclosure; and FIG. 5 illustrates a schematic of a base of the die inspection sorting system according to various embodiments of the present disclosure.

EXEMPLARY EMBODIMENT ONE

The present disclosure provides a die inspection sorting system. The die inspection sorting system may include a turntable 14 and a plurality of die picking assemblies 15 installed at an equal interval along the circumferential direction at the edge of the turntable 14. The die picking assembly 15 may further include a vertical support frame 16, a base 1 installed on the front side of the vertical support frame 16, a suction rod 2 installed vertically on the side of the base 1 away from the vertical support frame 16, and a clamping strip 3 installed horizontally above the base 1. The front end of the clamping strip 3 may extend to the side away from the vertical support frame 16 and may be clamped to be connected with the upper end of the suction rod 2. A limiting groove 4 extending vertically may be formed at the front end surface of the base 1. A left side and a right side of the limiting groove 4 for the suction rod 2 to be inserted may have a left inclined surface 51 and a right inclined surface 52 respectively. The left inclined plane 51 and the right inclined plane 52 may be symmetrically arranged. An end of each of the left inclined plane 51 and the right inclined plane 52 away from the limiting groove 4 may respectively extend forward. Two left bearings 61 spaced apart along the vertical direction may be installed on the left inclined surface 51; and two right bearings 62 arranged symmetrically with the left bearing 61 may be installed on the right inclined surface 52. An installation groove 7 extending horizontally may be formed at the front end surface of the base 1. A movable block 8 may be inserted in the installation groove 7 and slide to be matched with the inner wall of the installation groove 7. A limiting bearing 9 may be vertically installed on the front end of the movable block 8. A spring 10 in a compressed state may be connected between the rear end of the movable block 8 and the bottom surface of the installation groove 7, such that the suction rod 2 inserted in the limiting groove 4 may be squeezed and in a contact with the limiting bearing 9, the left bearings 61 and the right bearings 62.

The limiting bearing may exert a forward pressing force on the suction rod from a direct back side under the action of the spring, such that the suction rod may be in a close contact with the left and right bearings which are on the left and right sides and in the front of the suction rod. Therefore, the limiting bearing, the left bearing and the right bearing arranged in an isosceles triangle may continuously exert a stable and uniform elastic force on the suction nozzle rod, thereby achieving stable clamping of the suction rod. Furthermore, the centrifugal force of rotation may further improve the clamping force of the suction rod, such that the suction rod may always maintain stable state and accurate position.

In one embodiment, a groove for the front end of the spring 10 to be inserted may be formed at the rear end surface of above-mentioned movable block 8.

In one embodiment, a suction nozzle 13 may be installed at the lower end of above-mentioned suction rod 2.

In one embodiment, the rear surface of above-mentioned vertical support frame 16 may be installed on a connection base 18 through at least one set of a sliding rail 171 and a sliding block 172. The lower portion of the connection base 18 may be installed on the upper surface of the turntable 14.

In one embodiment, the sliding rail 171 extending vertically may be fixedly installed on the connection base 18, and the sliding block 172 slidingly matched with the sliding rail 171 may be fixedly connected to the rear surface of the vertical support frame 16.

EXEMPLARY EMBODIMENT TWO

The present disclosure provides a die inspection sorting system. The die inspection sorting system may include the turntable 14 and the plurality of die picking assemblies 15 installed at an equal interval along the circumferential direction at the edge of the turntable 14. The die picking assembly 15 may further include the vertical support frame 16, the base 1 installed on the front side of the vertical support frame 16, the suction rod 2 installed vertically on the side of the base 1 away from the vertical support frame 16, and a horizontal support plate 19. The limiting groove 4 extending vertically may be formed at the front end surface of the base 1. The left side and the right side of the limiting groove 4 for the suction rod 2 to be inserted may have the left inclined surface 51 and the right inclined surface 52 respectively. The left inclined plane 51 and the right inclined plane 52 may be symmetrically arranged. An end of each of the left inclined plane 51 and the right inclined plane 52 away from the limiting groove 4 may respectively extend forward. Two left bearings 61 spaced apart along the vertical direction may be installed on the left inclined surface 51; and two right bearings 62 arranged symmetrically with the left bearing 61 may be installed on the right inclined surface 52. The installation groove 7 extending horizontally may be formed at the front end surface of the base 1. The movable block 8 may be inserted in the installation groove 7 and slide to be matched with the inner wall of the installation groove 7. The limiting bearing 9 may be vertically installed on the front end of the movable block 8. The spring 10 in a compressed state may be connected between the rear end of the movable block 8 and the bottom surface of the installation groove 7, such that the suction rod 2 inserted in the limiting groove 4 may be squeezed and in a contact with the limiting bearing 9, the left bearings 61 and the right bearings 62.

In one embodiment, a pin 11 may be installed on above-mentioned movable block 8. A strip-shaped hole 12 may be formed on the base 1 for the pin 11 to be inserted. The strip-shaped hole 12 may extend both forward and backward along the horizontal direction.

In one embodiment, the suction nozzle 13 may be installed at the lower end of above-mentioned suction rod 2.

In one embodiment, the rear surface of above-mentioned vertical support frame 16 may be installed on the connection base 18 through at least one set of the sliding rail 171 and the sliding block 172. The lower portion of the connection base 18 may be installed on the upper surface of the turntable 14.

In one embodiment, the horizontal support plate 19 may be installed on the top of above-mentioned connection base 18. One end of the horizontal support plate 19 may be connected to the connection base 18, and another end of the horizontal support plate 19 may extend above the vertical support frame 16. A return spring 20 may be installed on each of left and right side of the horizontal support plate 19.

The upper portion of the return spring 20 extending vertically may be connected to the horizontal support plate 19, and the lower portion of the return spring 20 may be connected to the vertical support frame 16.

In one embodiment, a connection column 21 may be installed on the upper surface of the vertical support frame 16.

In one embodiment, the rear end of above-mentioned clamping strip 3 may be disposed with a support column 24 for adjusting the height of the suction rod 2. The lower surface of the support column 24 may be in contact with the upper surface of the base 1.

In one embodiment, the front end of above-mentioned base 1 may be disposed with a limiting block 22; and a limiting groove 23 may be formed on the surface of the limiting block 22 facing toward the suction rod 2.

The inspection sorting system may further include the clamping strip 3 installed horizontally above the base 1, where the front end of the clamping strip 3 may extend to the side away from the vertical support frame 16 and may be clamped to be connected with the upper end of the suction rod 2.

The working principle of the die inspection sorting system is described in detail hereinafter.

The limiting bearing may exert a forward pressing force on the suction rod from a direct back side under the action of the spring, such that the suction rod may be in a close contact with the left and right bearings which are on the left and right sides and in the front of the suction rod. Therefore, the limiting bearing, the left bearing and the right bearing arranged in an isosceles triangle may continuously exert a stable and uniform elastic force on the suction nozzle rod, thereby achieving stable clamping of the suction rod. Furthermore, the centrifugal force of rotation may further improve the clamping force of the suction rod, such that the suction rod may always maintain stable state and accurate position.

When above-mentioned die inspection sorting system is used, a stable and uniform elastic force may be exerted on the suction rod from three directions through the left and right bearings and the limiting bearing under the support action of spring to achieve stable clamping of the suction rod. Moreover, the centrifugal force of the rotation of the turntable may further improve the clamping force of the suction rod, such that the suction rod may always maintain stable state and accurate position without adverse interference caused by the rotation of the turntable.

Figure 6A:
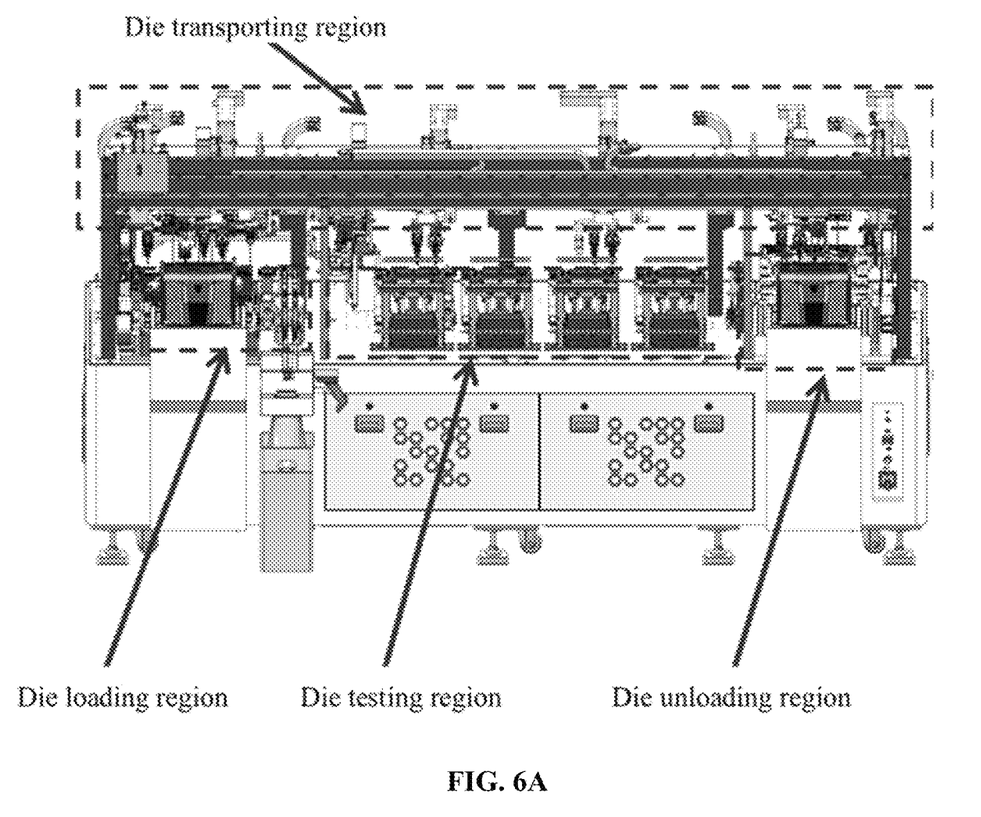
FIG. 6A illustrates a structural schematic of an exemplary die testing apparatus.
Figure 6B:
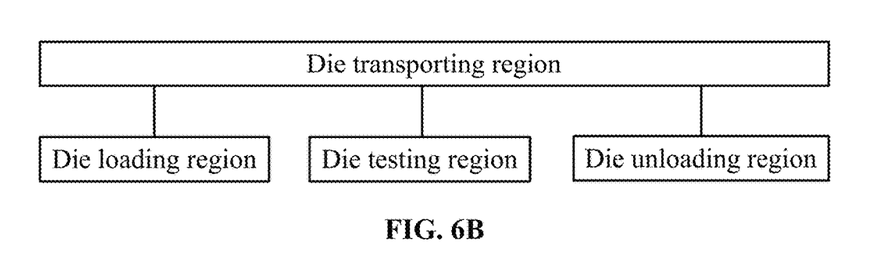
FIG. 6B illustrates a structural block diagram of the exemplary die testing apparatus in FIG. 6A.
Figure 7:
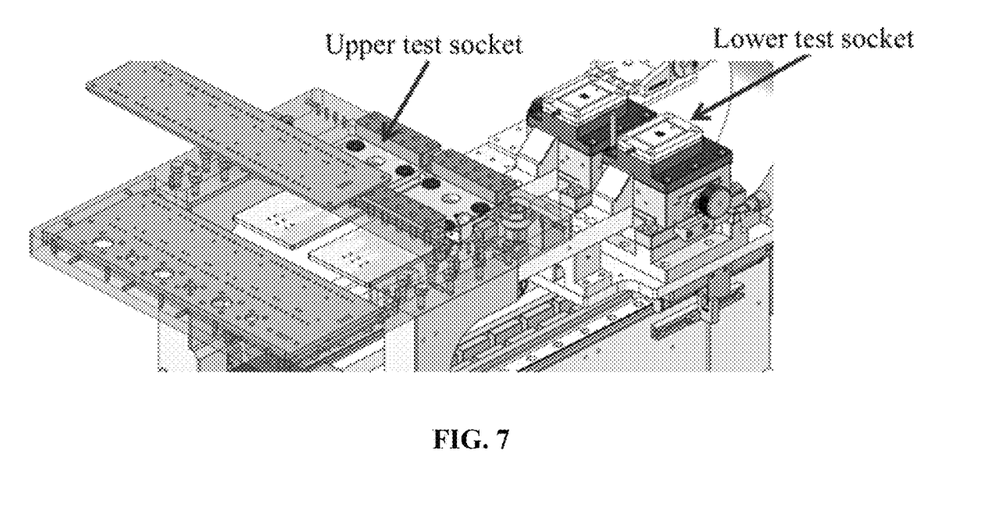
FIG. 7 illustrates a structural schematic of a die testing region of an exemplary die testing apparatus.

The main structure of a die testing apparatus (machine) may include four parts, that is, a die automatic loading region, a die transporting region, a die testing region and a die unloading region, as shown in FIGS. 6A-6B. Referring to FIGS. 6A-6B and 7, FIG. 6A illustrates a structural schematic of an exemplary die testing apparatus; FIG. 6B illustrates a structural block diagram of the exemplary die testing apparatus in FIG. 6A; and FIG. 7 illustrates a structural schematic of a die testing region of the exemplary die testing apparatus. The die inspection sorting system may be configured in the die testing region of FIGS. 6A-6B and 7.

The automatic die loading region may be configured for wafer loading, die positioning, die stripping and die picking; or automatically pick up the dies from a tape reel, and adapt to wafers of different sizes. The die transporting region may be configured for picking up dies by suction and transporting dies between different test stations. The die testing region may be configured for die position correction, temperature control and testing of different projects. The die testing region may be set up with multiple stations to support multi-station parallel testing or serial testing, and different test projects. The die unloading region may be configured for appearance inspection and unloading to different bins after the die testing is completed, so that dies may be tested and classified into different die bins. In the die automatic loading region, a conventional die loading apparatus may be utilized.

In the die transporting region, an imported high-speed linear motor may be utilized to ensure die transporting speed and stability. The main improvement lies in the suction nozzle transporting apparatus of the die. The suction nozzle transporting apparatus may include six sets of sub-suction-nozzle transporting apparatuses, which may operate in parallel without interfering with each other. Each set of sub-suction-nozzle transporting apparatus may include two suction nozzles which may suck two dies simultaneously. Each set of suction nozzles may be positioned independently to facilitate quick switching between different products. The suction nozzle may support temperature control and be preheated at high temperatures. The specially designed nozzle may avoid contact with the critical regions of the dies and reduce the risk of crushing injuries. The pressure of the suction nozzle to suck the dies may be adjustable to avoid improper suction or crushing of die surfaces. The suction nozzle may be disposed with a vacuum pressure sensor. By adjusting a vacuum pressure value, the adsorption strength of the suction nozzle may be ensured to prevent dies from falling during suction and transporting processes.

Referring to FIG. 7, in the die testing region, two dies on the suction nozzle may place materials (dies) to the calibration platform simultaneously. Two dies may perform position calibration simultaneously to reduce calibration time. Two sets of upper test sockets may be installed on a connection board, and each set of sockets may be switched and powered through a signal switch. A high-temperature nitrogen interface may be reserved on the socket of each set. Two sets of lower test sockets may be installed on a test carrier, each reserving two sets of temperature control interfaces. The upper and lower test sockets may be independent of each other, making position correction and maintenance more convenient. The lower test socket may be mounted on a high-speed linear motor and may quickly switch between a loading position and a testing position. A CCD (charge coupled device) may be disposed above a testing site to visually identify whether the die is correctly placed on the testing site. The testing site may be equipped with a vacuum pressure detection system. By determining a pressure value of a sucked die, whether the die is correctly placed on the site and whether there are any abnormalities such as warping may be determined, thereby ensuring that the die is correctly placed on the testing site and preventing warping or flipping.

In the die unloading region, a conventional material (die and/or wafer) unloading apparatus may be applied. An unloading station may be equipped with material (wafer/die) box in-situ detection to prevent unloading failure or abnormality due to that the material box is not empty in the unloading station or the material box is not in a safe position. A large-view CCD may be installed at the unloading station, which may monitor in real time whether an angle and a spacing of the die after being placed in the blue film are abnormal.

EXEMPLARY EMBODIMENT THREE

Figure 8:
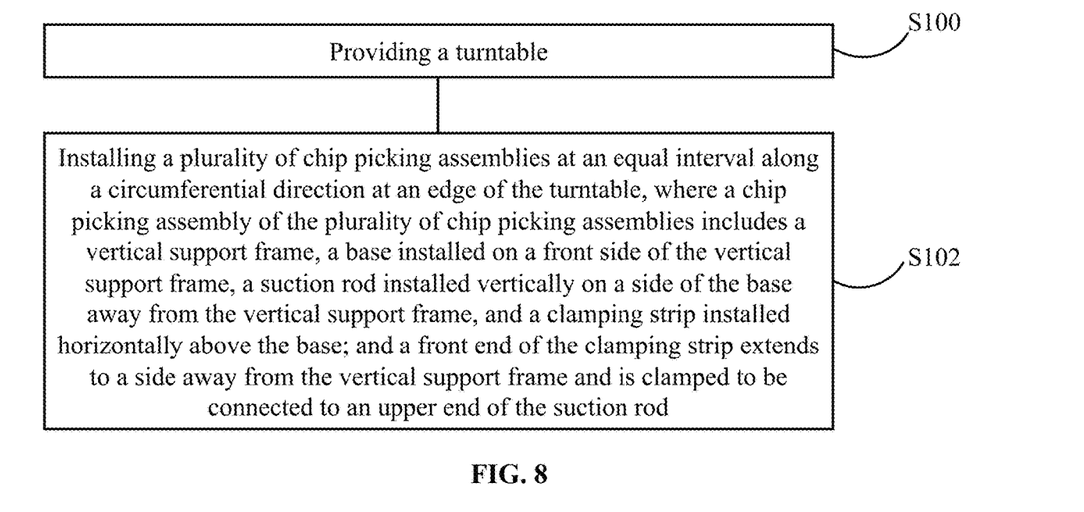
FIG. 8 illustrates a flowchart of a formation method of a die inspection sorting system according to various embodiments of the present disclosure.

The present disclosure provides a formation method of the die inspection sorting system. FIG. 8 illustrates a flowchart of the formation method of the die inspection sorting system according to various embodiments of the present disclosure. Referring to FIG. 8, the formation method may include following exemplary steps.

At S100, a turntable is provided.

At S102, a plurality of die picking assemblies is installed at an equal interval along a circumferential direction at an edge of the turntable. The die picking assembly 15 may further include the vertical support frame 16, the base 1 installed on the front side of the vertical support frame 16, the suction rod 2 installed vertically on the side of the base 1 away from the vertical support frame 16, and the clamping strip 3 installed horizontally above the base 1. The front end of the clamping strip 3 may extend to the side away from the vertical support frame 16 and may be clamped to be connected with the upper end of the suction rod 2.

The limiting groove 4 extending vertically may be formed at the front end surface of the base 1. The left side and the right side of the limiting groove 4 for the suction rod 2 to be inserted may have the left inclined surface 51 and the right inclined surface 52 respectively. The left inclined plane 51 and the right inclined plane 52 may be symmetrically arranged. An end of each of the left inclined plane 51 and the right inclined plane 52 away from the limiting groove 4 may respectively extend forward. Two left bearings 61 spaced apart along the vertical direction may be installed on the left inclined surface 51; and two right bearings 62 arranged symmetrically with the left bearing 61 may be installed on the right inclined surface 52. The installation groove 7 extending horizontally may be formed at the front end surface of the base 1. The movable block 8 may be inserted in the installation groove 7 and slide to be matched with the inner wall of the installation groove 7. The limiting bearing 9 may be vertically installed on the front end of the movable block 8. The spring 10 in a compressed state may be connected between the rear end of the movable block 8 and the bottom surface of the installation groove 7, such that the suction rod 2 inserted in the limiting groove 4 may be squeezed and in a contact with the limiting bearing 9, the left bearings 61 and the right bearings 62.

It may be seen from above-mentioned embodiments that the following beneficial effects may be at least achieved.

For the die inspection sorting system in the present disclosure, the limiting groove extending vertically is formed at the front end surface of the base of the die picking assembly installed on the turntable; the left side and the right side of the limiting groove for the suction rod to be inserted have the left inclined surface and the right inclined surface respectively; the left inclined plane and the right inclined plane are symmetrically arranged; an end of each of the left inclined plane and the right inclined plane away from the limiting groove extends forward; two left bearings spaced apart along the vertical direction are installed on the left inclined surface; and two right bearings arranged symmetrically with the two left bearings are installed on the right inclined surface; the installation groove extending horizontally is formed at the front end surface of the base; the movable block is inserted in the installation groove and slides to be matched with an inner wall of the installation groove; the limiting bearing is vertically installed on the front end of the movable block; and the spring in a compressed state is connected between the rear end of the movable block and the bottom surface of the installation groove to make the suction rod inserted in the limiting groove to be squeezed and in a contact with each of the limiting bearing, the two left bearings and the two right bearings. A stable and uniform elastic force may be exerted on the suction rod from three directions through the left and right bearings and the limiting bearing under the support action of spring to achieve stable clamping of the suction rod. Moreover, the centrifugal force of the rotation of the turntable may further improve the clamping force of the suction rod, such that the suction rod may always maintain stable state and accurate position without adverse interference caused by the rotation of the turntable.

Above-mentioned embodiments may be only for illustrating technical concepts and features of the present disclosure. The purpose may be to make those skilled in the art understand the content of the present disclosure and implement the present disclosure accordingly and may not limit the protection scope of the present disclosure. All equivalent changes or modifications made based on the spirit and essence of the present disclosure shall be included in the protection scope of the present disclosure.

What is claimed is:

1. A die inspection sorting system, comprising:
   a turntable; and
   a plurality of die picking assemblies installed at an equal interval along a circumferential direction at an edge of the turntable,
   wherein:
      a die picking assembly of the plurality of die picking assemblies includes a vertical support frame, a base installed on a front side of the vertical support frame, a suction rod installed vertically on a front side of the base away from the front side of the vertical support frame, and a clamping strip installed horizontally above the base; and
      a front end of the clamping strip extends forward away from the front side of the vertical support frame and is clamped to be connected to an upper end of the suction rod, and a rear end of the clamping strip is disposed with a support column for adjusting a height of the suction rod,
   wherein:
      a limiting groove extending vertically is formed at a front end surface of the base;
      a left side and a right side of the limiting groove for the suction rod to be inserted have a left inclined surface and a right inclined surface respectively;
      the left inclined surface and the right inclined surface are symmetrically arranged;
      an end of each of the left inclined surface and the right inclined surface away from the limiting groove extends forward;
      two left bearings spaced apart along a vertical direction are installed on the left inclined surface;
      two right bearings arranged symmetrically with the two left bearings are installed on the right inclined surface;
      an installation groove extending horizontally is formed at the front end surface of the base;
      a movable block is inserted in the installation groove and slides to be matched with an inner wall of the installation groove;
      a limiting bearing is vertically installed on a front end of the movable block;
      a spring in a compressed state is connected between a rear end of the movable block and a bottom surface of the installation groove to make the suction rod inserted in the limiting groove to be squeezed and in a contact with each of the limiting bearing, the two left bearings and the two right bearings;

a rear surface of the vertical support frame is installed on a connection base;
a horizontal support plate is installed on a top surface of the connection base;
one end of the horizontal support plate is connected to the connection base, and another end of the horizontal support plate extends above the vertical support frame;
a return spring is installed on each of left and right sides of the horizontal support plate;
an upper portion of the return spring extending vertically is connected to the horizontal support plate, and a lower portion of the return spring is connected to the vertical support frame; and
the front end of the base is further disposed with a limiting block, and a limiting groove is formed on a surface of the limiting block facing toward the suction rod.

2. The die inspection sorting system according to claim 1, wherein:
a groove for a front end of the spring to be inserted is formed at a rear end surface of the movable block.

3. The die inspection sorting system according to claim 1, wherein:
a pin is installed on the movable block;
a strip-shaped hole is formed at the base for the pin to be inserted; and
the strip-shaped hole extends both forward and backward along a horizontal direction.

4. The die inspection sorting system according to claim 1, wherein:
a suction nozzle is installed at a lower end of the suction rod.

5. The die inspection sorting system according to claim 1, wherein:
the rear surface of the vertical support frame is installed on the connection base through at least one set of a sliding rail and a sliding block; and
a lower portion of the connection base is installed on an upper surface of the turntable.

6. The die inspection sorting system according to claim 5, wherein:
the sliding rail extending vertically is fixedly installed on the connection base, and the sliding block slidingly matched with the sliding rail is fixedly connected to the rear surface of the vertical support frame.

7. The die inspection sorting system according to claim 1, wherein a connection column is installed on an upper surface of the vertical support frame.

8. The die inspection sorting system according to claim 1, wherein a lower surface of the support column is in contact with an upper surface of the base.

* * * * *